US012260467B2

(12) United States Patent
Jha et al.

(10) Patent No.: US 12,260,467 B2
(45) Date of Patent: Mar. 25, 2025

(54) MOBILITY-AS-A-SERVICE FOR USER EXPERIENCE

(71) Applicant: Intel Corporation, Santa Clara, CA (US)

(72) Inventors: Satish Chandra Jha, Portland, OR (US); S M Iftekharul Alam, Hillsboro, OR (US); Ned M. Smith, Beaverton, OR (US); Vesh Raj Sharma Banjade, Portland, OR (US); Kathiravetpillai Sivanesan, Portland, OR (US); Arvind Merwaday, Beaverton, OR (US); Ignacio Javier Alvarez Martinez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 17/132,927

(22) Filed: Dec. 23, 2020

(65) Prior Publication Data

US 2021/0118081 A1 Apr. 22, 2021

(51) Int. Cl.
*G06Q 50/40* (2024.01)
*G01C 21/34* (2006.01)
*G06Q 10/02* (2012.01)
*G06Q 20/14* (2012.01)

(52) U.S. Cl.
CPC ......... *G06Q 50/40* (2024.01); *G01C 21/3438* (2013.01); *G06Q 10/02* (2013.01); *G06Q 20/145* (2013.01)

(58) Field of Classification Search
CPC .............................. G06Q 50/30; G06Q 10/02
See application file for complete search history.

(56) References Cited

U.S. PATENT DOCUMENTS

| | | | |
|---|---|---|---|
| 2010/0238798 A1* | 9/2010 | Ahuja | H04W 12/084 455/67.11 |
| 2018/0307537 A1 | 10/2018 | Chen et al. | |
| 2019/0026796 A1* | 1/2019 | Dinis da Silva de Carvalho | G06Q 50/40 |
| 2019/0205115 A1 | 7/2019 | Gomes | |
| 2020/0008044 A1 | 1/2020 | Poomachandran et al. | |

(Continued)

OTHER PUBLICATIONS

Najmi, Ali, Taha H. Rashidi, and Wei Liu. "Ridesharing in the era of Mobility as a Service (MaaS): An Activity-based Approach with Multimodality and Intermodality." arXiv preprint arXiv:2002. 11712 (2020). (Year: 2020).*

(Continued)

*Primary Examiner* — Emmett K. Walsh
(74) *Attorney, Agent, or Firm* — Schwegman Lundberg & Woessner, P.A.

(57) ABSTRACT

Systems and techniques for mobility-as-a-service for user experience are described herein. An orchestration log may be maintained that includes current orchestration data. An orchestration backup record may be generated that includes alternate MaaS nodes on the MaaS network. It may be determined that connectivity is lost to a first orchestration container hosted by a first MaaS node. An orchestration container is generated using the orchestration log to maintain orchestration functionality. An available second MaaS node is identified from the alternate MaaS nodes. The orchestration container may be transferred to the second MaaS node.

21 Claims, 9 Drawing Sheets

(56) References Cited

U.S. PATENT DOCUMENTS

2020/0034258 A1     1/2020    Avraham et al.
2020/0257704 A1     8/2020    Du et al.

OTHER PUBLICATIONS

Liimatainen, Heikki, "Understanding the complexity of mobility as a service : A proposed tool for understanding requirements and effects, and for aiding the integration of societal goals", Research in Transportation Business and Management, vol. 27, (2018), pp. 1-2.

Sochor, Jana, "A topological approach to Mobility as a Service: A proposed tool for understanding requirements and effects, and for aiding the integration of societal goals", Research in Transportation Business and Management, vol. 27, (2018), 20 pgs.

Weckstrom, Christoffer, "User perspectives on emerging mobility services: Ex post analysis of Kutsuplus pilot", Research in Transportation Business andManagement, vol. 27, (2018), pp. 84-97.

"European Application Serial No. 21209119.3, Communication Pursuant to Article 94(3) EPC mailed Feb. 6, 2024", 8 pgs.

"European Application Serial No. 21209119.3, Response filed May 10, 2024 to Communication Pursuant to Article 94(3) EPC mailed Feb. 6, 2024", 12 pgs.

"European Application Serial No. 21209119.3, Response filed Nov. 24, 2022 to Extended European Search Report mailed May 2, 2022", 8 pgs.

"European Application Serial No. 21209119.3, Extended European Search Report mailed May 2, 2022", 12 pgs.

Ravindran, Ravishankar, "5G-ICN Delivering ICN Services over 5G Using Network Slicing", IEEE Communications Magazine, (May 2017), 101-107.

Sabella, Dario, "Edge Computing: from standard to actual infrastructure deployment and software development Authors", https: www.martechcube.com resources intel_ql_nt where_is_the_edge edge-computing-from-standard-to-actual-infrastructuredeployment-and-software-development.pdf, (Oct. 1, 2019), 41 pgs.

\* cited by examiner

MOBILITY-AS-A-SERVICE FOR USER EXPERIENCE

TECHNICAL FIELD

Embodiments described herein generally relate to Mobility-as-a-Service (MaaS) networks and, in some embodiments, more specifically to using MaaS for first and last mile user experience.

BACKGROUND

Network connectivity (e.g., the internet, etc.) may be limited in rural and developing areas of the world. Economic conditions, geographic limitations, population sparsity, etc. may be a challenge to wide-spread availability of connectivity infrastructure. As the world becomes more internet connected, the desire for network connectivity increases.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
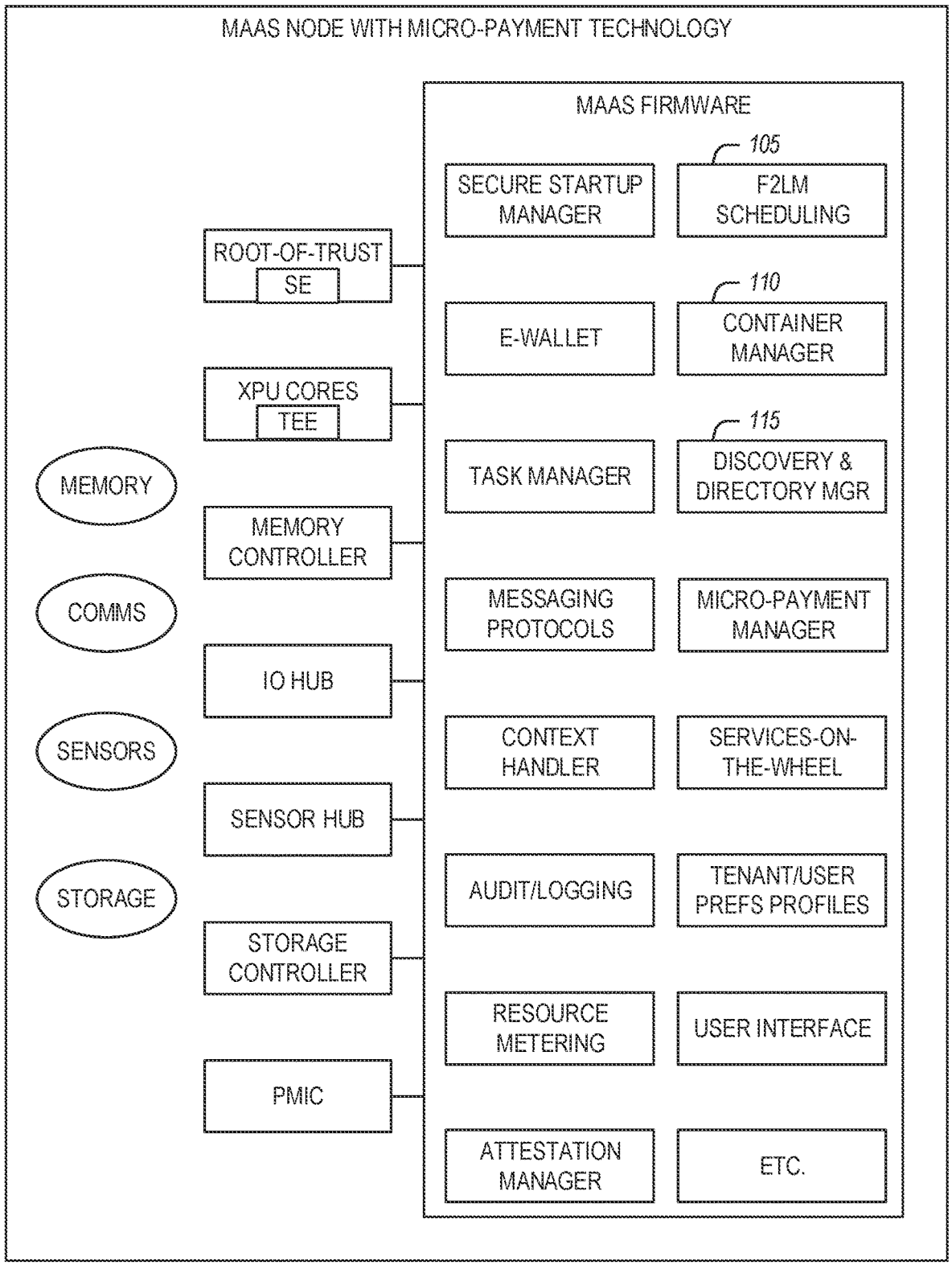
FIG. 1 is a block diagram of an example of a mobility-as-a-service (MaaS) node with first-to-last mile (F2LM) capability for mobility-as-a-service for user experience, according to an embodiment.

There are many geographies in third world countries, rural areas, and underdeveloped communities where the last-mile infrastructure is lacking as compared to first world countries and densely populated cities. However, these rural geographies are growing in popularity as populations migrate increasingly into more rural geographies where infrastructure to support e-economies is underdeveloped.

The social, cultural, philosophical and economic contexts often create a sense of dissonance if not anticipated and matched properly. For example, transportation solutions/services (public or private) lack mechanisms to continuously assess need/experience of users and ensure fair social inclusiveness for a diverse user base.

Similarly, rural and underdeveloped geographic areas have very low access to mobility services, connectivity, and automation. Connectivity may be intermittent, services have higher latency, higher jitter, and local infrastructure often lacks smart capabilities, etc. These factors increase the impression of isolation, lack of community while also increasing health and safety risks.

User experiences are impacted for aspects of everyday living such as trip planning, paying for goods/services, and making best use of available resources such as a mode of transportation or sharing tools and other implements which is common among rural communities. Nevertheless, the people, vendors, and businesses need to establish trust and security in order to enhance user confidence/comfort when engaged in automated services.

Traditional solutions for providing connectivity to users have a number of drawbacks. There may be a lack of infrastructure (e.g., sparsely deployed fleet, connectivity, etc.) and a lack of proper user interfaces may limit social inclusion. To address this issue with traditional connectivity solutions, many vehicles may be deployed in a sparse community to allow users to enjoy the benefit of mobility-as-a-service (MaaS) and service-on-the-wheels resulting in an improvement in social inclusion. However, deploying a large number of vehicles may not be economically viable for MaaS operators and demands for an intelligent strategy for managing MaaS services. Particular user groups may be more comfortable with one form of service access (e.g., via phone call, text, or local MaaS station/hotspot, etc.) vs. another form of service access (e.g., MaaS App, etc.).

There may be a language barrier, use of a native language, or local dialect that may add to a lack of inclusiveness and poor user experience. First/last mile experience is often ignored by many Edge and Cloud service offerings. Increased attention to first and last mile user experiences results in an increased sense of social inclusion and improved user experience. Infrastructure limitations may impose unintended limitations. For example, narrow or congested roads limit access to some geographical areas or social groups via traditional transportation (e.g., bus, car, taxi, etc.). Extending MaaS capabilities to traditionally dumb forms of traditional transportation and turning them in to smart versions of the same (e.g., e-rickshaw, e-bike, e-scooter, MaaS enabled animals for a pleasure trip, segue, etc.) empowers access. This uses a seamless integration of MaaS with local and non-traditional forms of transportation.

Users work through applications for aspects of a multi-modal MaaS trip from planning, paying, and using vehicles from multiple transportation operators with varying service quality. A reputation framework is useful to capture user trust or confidence in terms of various forms of MaaS service offerings and in terms of social interaction contexts. Integration of reputation into the MaaS planning services helps lower the barriers to participation based on lack of familiarity with MaaS and MaaS-enabled social applications.

Although a desire for user experience and social inclusion has been recognized to develop sustainable MaaS, effective solutions to achieve enhanced user experience to improve social inclusion and user experiences in rural/sparsely populated regions in an economically viable way has not been accomplished. Traditional solutions do not enhance first/last mile MaaS service by incorporating reputation score in a MaaS service and combining/integrating services-on-the-wheel with MaaS services as discussed herein.

A first-to-last mile (F2LM) architecture and platform are used for deploying and delivering MaaS services to MaaS nodes as container-encapsulated applications. Services-on-wheels automatic discoverability and orchestration is enabled with MaaS infrastructure nodes to facilitate MaaS user experience in rural areas. In addition, a user-focused reputation system is provided for the MaaS services integrated with a micro-payment solution to support user experience (UX) and quality of service (QoS) MaaS monitoring.

A F2LM platform integrates services and endpoints that are based on a MaaS node building block architecture. F2LM services are lightweight and decentralized services encapsulated in highly portable containers. Service hosting environments may be migrated opportunistically as connectivity (or lack thereof) demands. F2LM services are tailored to meet the special needs of rural and occasionally connected environments. The F2LM platform anticipates the special opportunities for capitalizing on nascent last mile transportation systems (e.g., pack animal, bike, scooter, small gauge rail, ride-sharing service, etc.). The FT2LM platform integrates a payment system that, in some cases, may be the only available electronic payment capability.

The systems and techniques discussed herein enable the joint deployment of MaaS applications in rural areas through a coordinated orchestration of MaaS enabling systems (e.g., application, billing, reputation services, etc.). This allows for scalable deployment (e.g., provisioning, load balancing, recovery, etc.) of various MaaS services (e.g., Robotaxi, etc.) and F2LM functions to create enhanced user experiences and socially inclusive collaborations while maintaining a cost-effective deployment of MaaS services in new geographical areas that are suited to F2LM.

Social inclusion and user experiences are enhanced by enhancing MaaS service integration into first/last mile mobile technologies, making them smarter, more connected when connectivity allows, and more autonomous when connectivity does not allow. Greater social and operational contexts are integrated to lower the barriers to person-person, person-thing, and person-service interactions. Services-on-the-wheel is combined and integrated with MaaS services to improve social inclusion experiences in rural/sparsely populated regions (as well as to urban regions as well) in an economically viable way.

FIG. 1 is a block diagram of an example of a mobility-as-a-service (MaaS) node 100 with first-to-last mile (F2LM) capability for mobility-as-a-service for user experience, according to an embodiment.

FIG. 1 illustrates a MaaS F2LM platform that integrates services and endpoints that are based on a MaaS node building block architecture. Various building blocks of the MaaS node 100 architecture are shown in FIG. 1. Many of the components of the MaaS node 100 shown in FIG. 1 may be run as a container. An FL2M scheduler 105 differs from a more traditional task scheduler in that it may assume an orchestration role as needed to respond to network outages, loss of network connectivity, etc. resulting in the MaaS node 100 becoming isolated from orchestration services. The FL2M scheduler 105 may, upon detection of loss of access to orchestration services, dynamically setup a replacement orchestration service provider. A container manager 110, in addition to performing traditional container and pod management (e.g., Kubernetes, etc.), also manages hosting of F2LM roles (e.g., scheduling, orchestration, discovery, etc.) such that an available MaaS node 10 may dynamically and flexibly load balance, replicate, and resiliently respond to meet unforeseen changes in a F2LM network deployment profile. A discovery and directory manager 115 ensures that nodes have a presence (e.g., are discoverable) even when connectivity may, temporarily, hide their existence.

Figure 2:
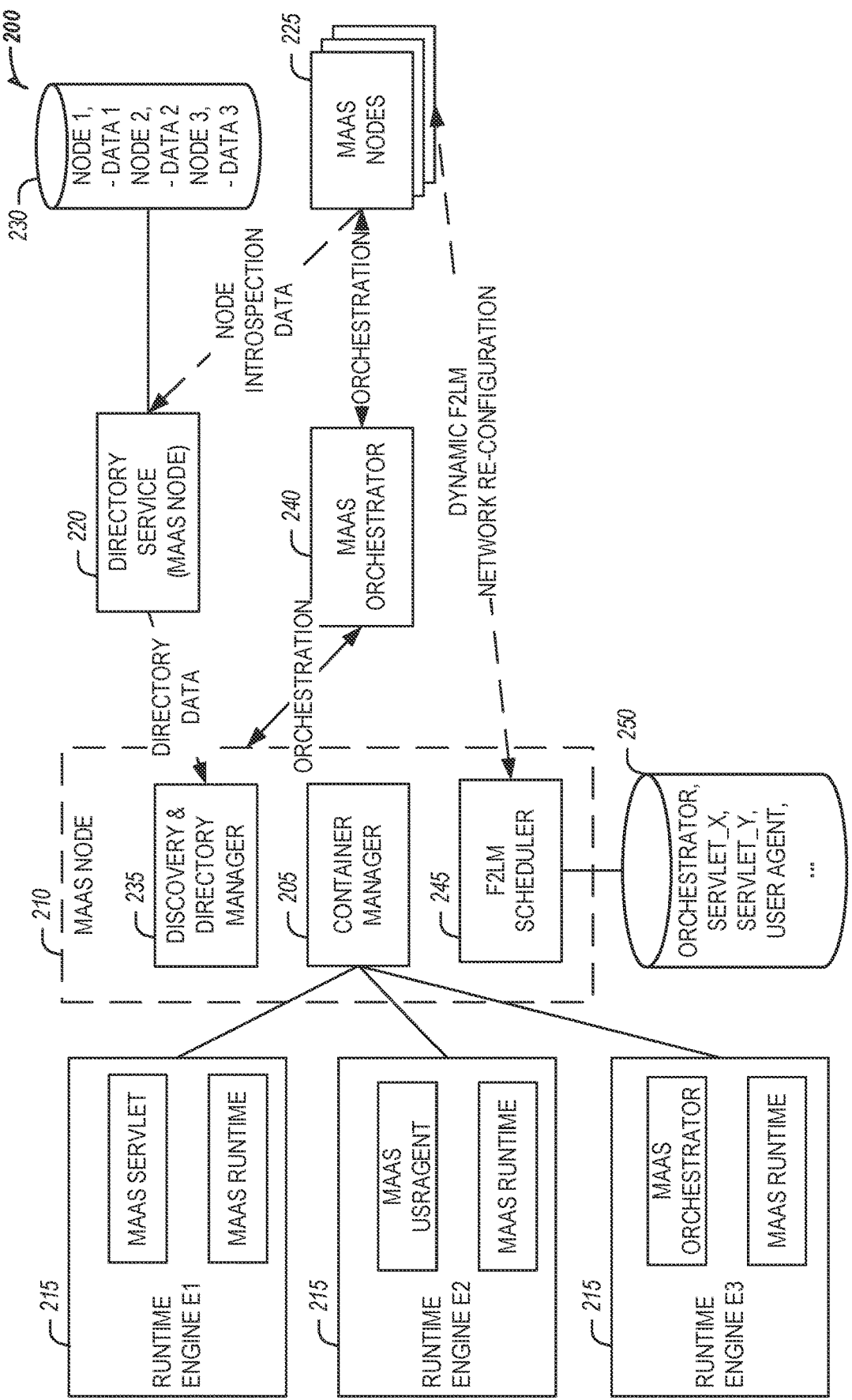
FIG. 2 illustrates an example of a mobility-as-a-service (MaaS) first-to-last mile (F2LM) architecture for mobility-as-a-service for user experience, according to an embodiment.

FIG. 2 illustrates an example of a mobility-as-a-service (MaaS) first-to-last mile (F2LM) architecture 20 for mobility-as-a-service for user experience, according to an embodiment. FIG. 2 may provide features as described in FIG. 1.

F2LM services are lightweight decentralized services encapsulated in highly portable containers. A container manager 205 works in connection with other MaaS node 200 capabilities to facilitate hosting environments for containers 215. These environments may involve any xPU resource (e.g., central processing unit (CPU), graphics processing unit (GPU), image processing unit (IPU), network processing unit (NPU), etc.), field programmable gate array (FPGA), embedded micro controller, etc. The container interface is standard across the various hosting resources enabling easy migration or instantiation of F2LM services on any available MaaS node 225. A directory service MaaS node 220 shows an available MaaS node 225 that has been repurposed as a directory service provider. The directory service MaaS node 220 has storage resources sufficient to hold discovery and registry information 230 about other MaaS nodes 225 that may become hidden due to network connectivity failures, blackouts, greyouts, etc. A MaaS node 225 may support multiple redundant directory service providers.

Directory service providers like directory service MaaS node 220 work cooperatively to maintain current directory and registry information 230 of all MaaS nodes 225. The directory service nodes may employ named data networking (NDN) techniques to build a distributed directory among the various MaaS nodes 225 where some nodes function as NDN routers that cache registry contents available through peer routers and endpoint discovery and directory mangers (D&DM) 235. A nearest neighbor protocol may be used in connection with the NDN to query peer D&DM 235 nodes to show interest in the full or partial directory contents. A MaaS Node 225 may then easily become a D&DM 235 node by locating a NDN router node and replicating cached contents. As a D&DM 235 MaaS node 210, peer MaaS nodes 225 may discover the newly formed D&DM 235 MaaS node 200 and may show interest in some other MaaS node 225. Either the request may be satisfied directly from the cached content or a request may be made to the NDN network to obtain it from another D&DM 235 node. This approach ensures robust availability of directory information for the F2LM network.

Additionally, a MaaS orchestrator 240 function may be hosted by a typical MaaS Node 225. Orchestration behavior consists of a planning function that monitors (discovers) available MaaS nodes, identifies which F2LM services it is hosting, and accepts requests to host various workload requests that may be made by other MaaS nodes 225. Workload requests may be to perform MaaS services (e.g. services-on-the-wheel, fleet management, sensor-as-a-service, route planning, payment processing, AI inference/training, robotaxi providing only basic transportation service, etc.).

A F2LM scheduler 245 may assume an orchestration role as needed to respond to network outages, loss of network connectivity, etc. resulting in the MaaS node 210 becoming isolated from orchestration services from the MaaS orchestrator 240. The F2LM scheduler 245 may, upon detection of loss of access to orchestration services, dynamically setup a replacement orchestration service provider. An orchestration cache 250 may be maintained locally by the F2LM scheduler 245

Figure 3A:
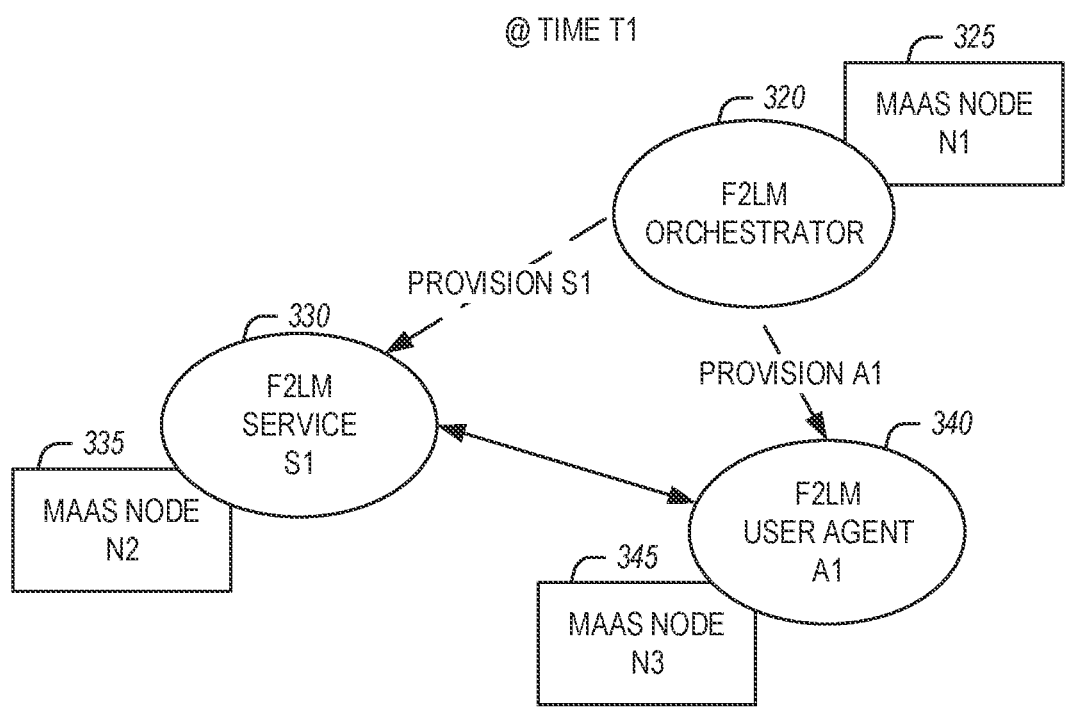
FIGS. 3A-3C illustrates an example of a time series showing dynamic first-to-last mile (F2LM) network reconfiguration for mobility-as-a-service for user experience, according to an embodiment.
Figure 3B:
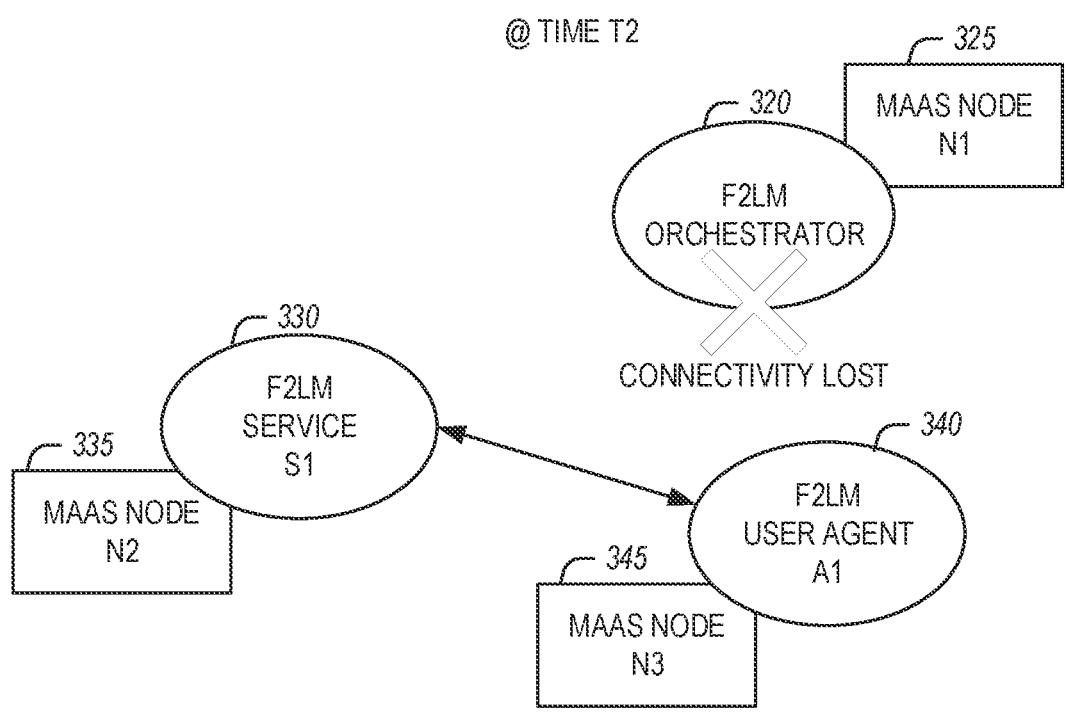
Figure 3C:
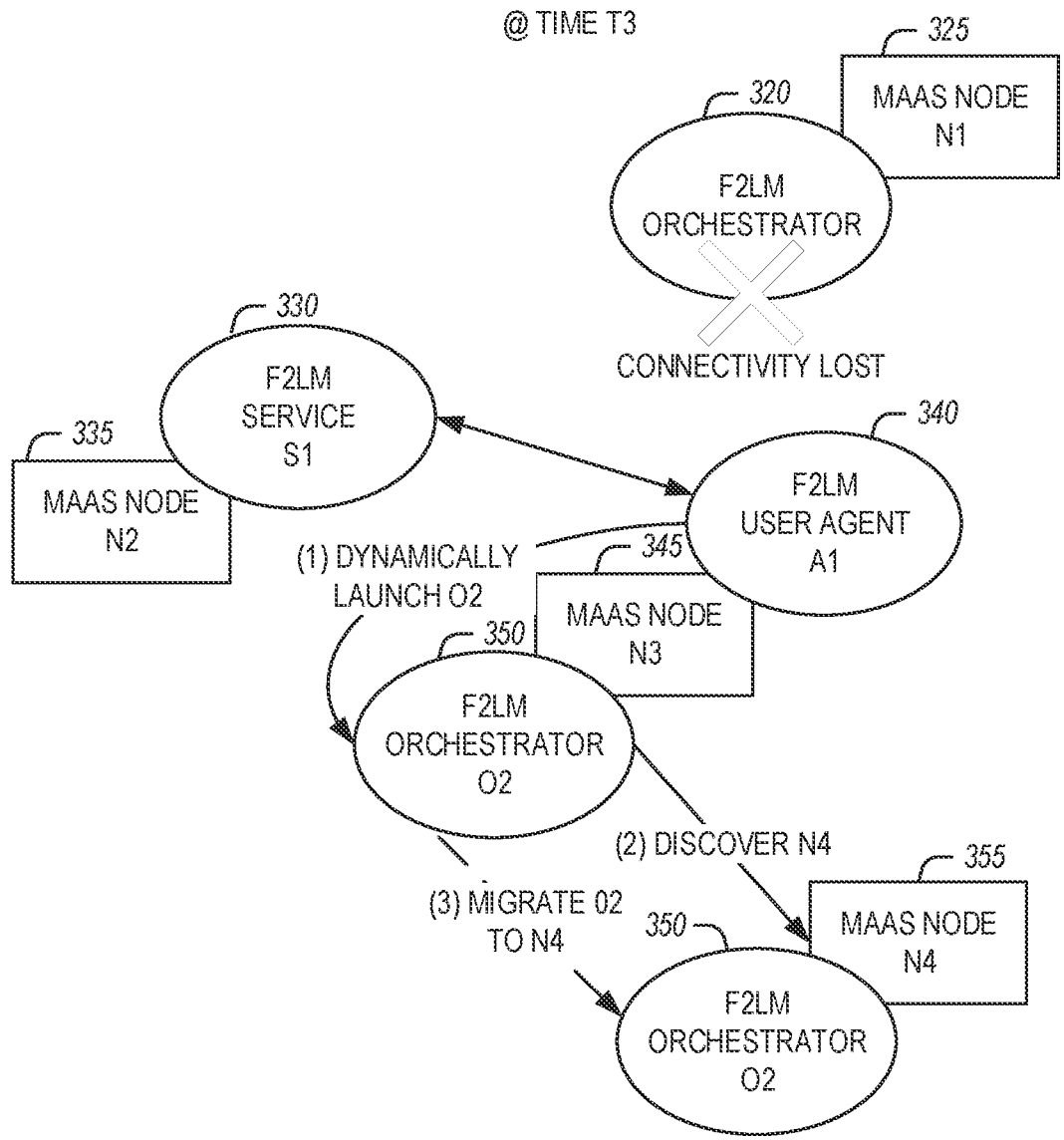

FIGS. 3A-3C illustrates an example of a time series 300, 305, and 310 showing dynamic first-to-last mile (F2LM) network reconfiguration for mobility-as-a-service for user experience, according to an embodiment. FIGS. 3A to 3C may provide features as described in FIGS. 1 and 2.

Service hosting environments may be migrated opportunistically as connectivity (or lack thereof) demands. F2LM services are tailored to meet the special needs of rural and occasionally connected environments. For example, FIGS. 3A to 3C show a series of behaviors where dynamic F2LM network reconfiguration occurs when the connection to the orchestrator by user and/or service provider are lost.

In time t1 300 as shown in FIG. 3A, the F2LM network shows an orchestrator 320 hosted on MaaS node N1 325 a F2LM Service provider 330 (e.g., robotaxi, etc.) hosted on MaaS node N2 335 and a user agent 340 hosted on MaaS node N3 345 that may be a user seeking a robotaxi ride. The orchestrator 320 may have placed MaaS node N2 335 and MaaS node N3 345 in connection with the other and initiated the service or transaction.

However, at time t2 305 as shown in FIG. 3B, the connection to the orchestrator 320 is lost due to a network outage. The user agent 340 may yet require instructions from the orchestrator 320 to, for example, re-negotiate the robotaxi fare.

However, upon recognizing loss of connection to the orchestrator 320, a F2LM scheduler of MaaS node N3 345, at time t3 310 as shown in FIG. 3C, responds by discovering an alternative MaaS node N4 355 that is capable of handling orchestration requests and launches and provisions the MaaS node N4 355 to replace the orchestrator 320 with orchestrator O2 350 for the purpose of completing the in-progress robotaxi transaction. The new orchestrator O2 350 may require context that is held by the orchestrator 320 hosted on MaaS node N1 325. To achieve consistency and continuity of orchestration, several strategies for building redundancy and resiliency into the F2LM network may be employed.

MaaS node N4 355 and other MaaS nodes are identified by the orchestrator 320 hosted by MaaS node N1 325 as orchestration state backup nodes. The backup nodes are not actively running orchestration functions but are used as logging nodes to maintain replicate images of the orchestrators checkpoint and restart logs. When the primary orchestrator 320 loses connection, the backup begins functioning as a new orchestrator (e.g., orchestrator O2 350) from the log it already has.

Directory nodes may be used by the orchestrator 320 hosted by MaaS node N1 325 to maintain copies of checkpoint and restart logs. Rather than themselves becoming backup orchestrators, the MaaS node N3 345 may query a directory node to obtain the most current restart log that is provisioned to the target orchestrator O2 350.

Figure 4:
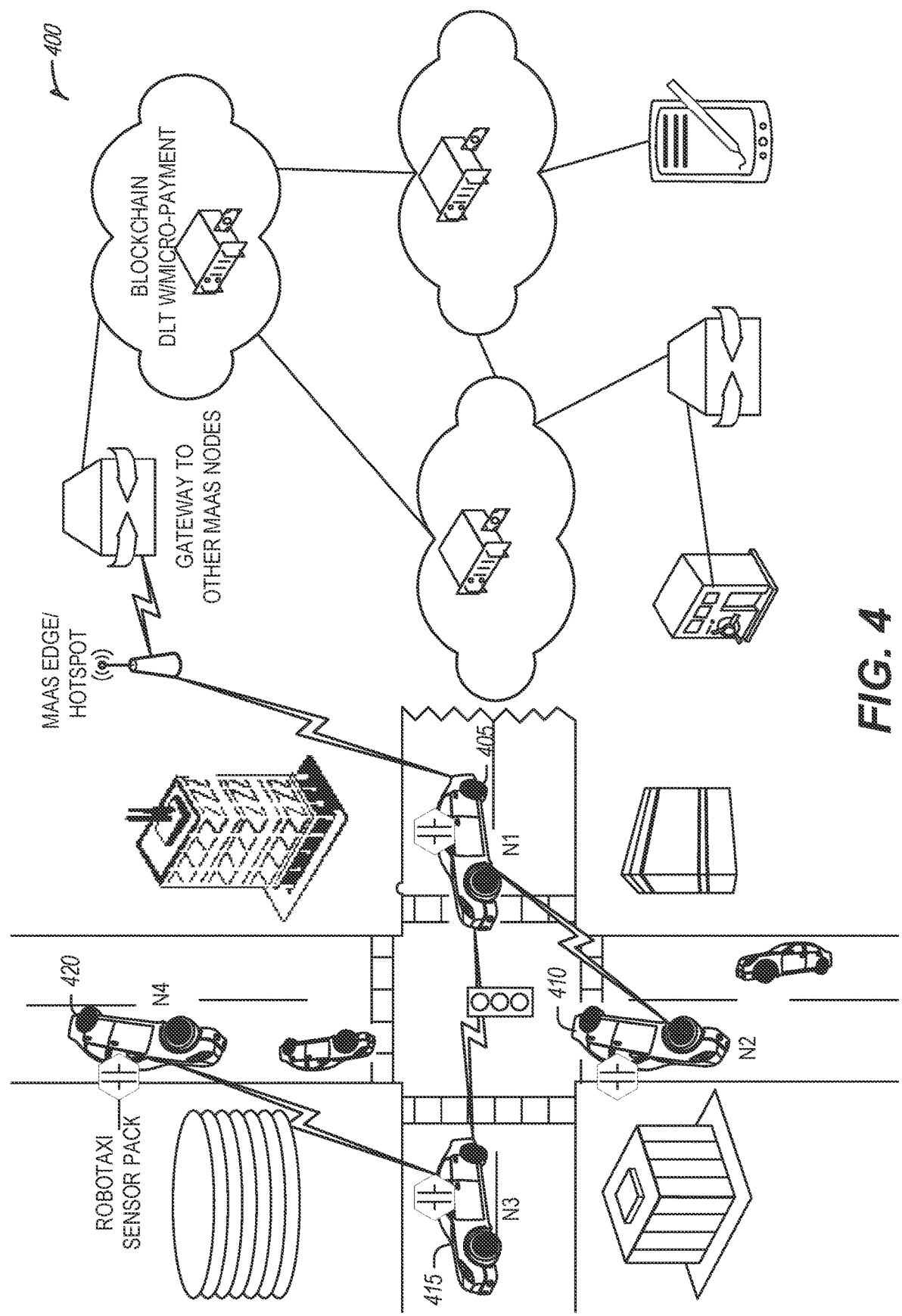
FIG. 4 illustrates an example of a mobility-as-a-service (MaaS) micro-payment infrastructure using a distributed ledger technology (DLT) (e.g., blockchain) to perform micro-transactions for MaaS services that may extend to the last/first mile, according to an embodiment.

FIG. 4 illustrates an example of a mobility-as-a-service (MaaS) micro-payment infrastructure 400 using a distributed ledger technology (DLT) (e.g., blockchain) to perform micro-transactions for MaaS services that may extend to the last/first mile, according to an embodiment. FIG. 4 may provide features as described in FIGS. 1, 2, and 3A to 3C.

Micro-transactions are cleared using the MaaS micro-payment infrastructure 400 that may be implemented both on MaaS nodes directly or on Edge/Cloud hosting services.

Nodes N1 405, N2 410, N3 415, and N4 420 create a dynamic network to reach the micro-payment infrastructure 400 through node N1 405.

The F2LM platform anticipates the special opportunities for capitalizing on nascent last mile transportation systems (e.g., pack animal, bike, scooter, small gauge rail, etc.). For that purpose, the F2LM platform integrates a payment system called MaaS Micro-Payment Technology (MPT) that, in some cases, is the only available electronic payment capability.

The proposed F2LM platform enhances social inclusion and user experiences by enhancing MaaS service integration into first/last mile mobile technologies. This adds intelligence and enhance connectivity to the MaaS network when connectivity is available and allows the MaaS network to operate autonomously when connectivity is not available.

Greater social and operational contexts are integrated to lower the barriers for person-person, person-thing, and person-service interactions by dynamically deploying a container-based approach to services and agents across a highly distributed, highly mobile environment. An F2LM endpoint has the capabilities necessary to perform all the essential functions of a distributed service network including dynamic service discovery as connectivity and availability allows dynamic leader-less role assignment that ensures the essential roles of a service network are reconstructed as needed. For example, roles such as service orchestration, service discovery, service hosting, payment processing, task scheduling, task execution etc. can be established on-demand.

A mechanism is used for geographical area specific users to maintain preferred Services-on-the-Wheel profiles for various geographical areas so that if a trip is planned to the geographical area, targeted services-on-the-wheel may be presented to the user. For example, a geographical area scoped advertisement forwarding mechanism may be used to send a customized geographical area scoped advertisement to MaaS users based on geographical area specific profile.

For example, user preferred Services-on-the-Wheel profiles are used to target advertisements that are most relevant. The MaaS route plan identifies the services, acquaintances and other social contexts that interest users while in the geographic region of the MaaS route. MaaS services/agents handle solicitations/advertisements/notifications confined to the MaaS route context.

A local MaaS Hotspot (Payment/Service-Station) acts as a local coordinator for MaaS service in geographical areas to handle presentation of services-on-the-wheel and other Maas requests/services. A user interface is provided that is customized to social, cultural, technology-comfort-level, and economical status of the local geographical areas such as a user interface in local languages, options to call a MaaS-controller to buy services, alternative ways of payment (e.g., cash, various types of cards, etc.) suitable to diverse user groups in that specific region, and so on. In extremely rural deployments, the MaaS F2LM platform may be the only viable automated payment infrastructure.

For the geographical areas with limited infrastructure, either a stationary MaaS Hotspot deployment or a mobile MaaS node may act as a MaaS Hotspot under the F2LM platform by deploying a container-based approach to all the essential functionalities/services. In both cases, a MaaS Hotspot provides an interactive user interface (e.g., similar to parking meter, ATM, etc.) and acts as a MaaS service agent to handle presentation of services-on-the-wheel and other user requests. MaaS Payment services are integrated including micro-payment infrastructure so that exchange of coupons, vendor incentives, payments and so forth are coordinated through the MaaS route plan and seamlessly integrated into a MaaS user experience.

These enhancements improve geographical area based social inclusion in mobility access in rural and low populated areas. Fair mobility access provision in these areas may not be economically attractive, therefore, services-on-the-wheel is integrated along with existing mobile vehicle infrastructure making trips to these areas to develop sustainable MaaS.

The MaaS Hotspot may continuously run a tenant/user preferences profiles container to collect and analyze user requests for services-on-the-wheel in the associated geographical area. The tenant/user preferences profiles container may use intelligent learning to find out aggregated geographical area user specific preferences specifically for services-on-the-wheel. An aggregated report is sent to a MaaS-center periodically or based on events (e.g., a significant change in preferences detected, a new service-on-the-wheel becomes popular, etc.). The profile may be referred to as Geo-Area-Services-on-the-Wheel-Preference-Profile. Example contents of Geo-Area-Services-on-the-Wheel-Preference-Profile may be as shown in Table 1.

TABLE 1

| List of Items Popular for Services-on-the-Wheel | e.g., Organic Grocery, Medicines, Specific Food from city |
| --- | --- |
| List of Items Popular on specific day of week or time of day for Services-on-the-Wheel | MaaS center may intelligently schedule vehicle for Services-on-the-Wheel based on this information and solicit/advertise it to users. May use geographic area scoped advertisement mechanism. |
| Preferred Price-range for Services-on-the-Wheel | This concept may be useful for repetitive/same/very similar service request for Services-on-wheels |
| Preferred time flexibility for Services-on-the-Wheel for various Popular Items | It gives MaaS center idea of delay users can tolerate once advertisement/solicitation for such services sent to users. Minutes, hours or a few days. |
| List of Preferred Modes of Payment for Services-on-the-Wheel | |

To advertise Services-on-the-Wheel, the Geo-Area-Services-on-the-Wheel-Preference-Profile is used for a geographical area if a trip is planned to the geographical area. The MaaS center may present targeted services-on-the-wheel by sending a geographical area scoped advertisement to MaaS users in that geographical area and to the MaaS Hotspot in that geographical area.

A MaaS Hotspot in the geographical area may have better connectivity to the MaaS control-center/controller. A MaaS service provider may have an agreement with a network provider and with local government for this purpose. The MaaS Hotspot may then display (or send to users using a different radio) such advertisement or combination of multiple such advertisements frequently to encourage people to order Services-on-the-Wheel at a potentially lower price.

Users in these geographical area may request trips and Services-on-the-Wheel in advance (e.g., tomorrow, this week, with time flexibility, etc.) to the Mass center (directly or through a local MaaS Hotspot), so that a MaaS service center may combine multiple requests to provide cost effective MaaS service. A MaaS Hotspot may further solicit service request from users with similar interests in respective user profiles after receiving a request for Services-on-the-Wheel from a few users with time flexibility.

A geographical area customized advertisement is sent to the associated geographical area by incorporating destination geographical area information in the advertisement packet. The packet may then be forwarded towards the destination geographical area (e.g., using unicast, hop-by-hop, etc.) until it reaches the destination geographical area. Then it will be broadcast or groupcast to reach targeted users in the destination geographical area. A location-based routing/forwarding solution is used for this purpose.

MaaS services are extended beyond the road and beyond traditional transportation. Last mile or first mile transportation may include a wide variety of alternative forms of transportation in addition to walking and smart personal vehicles (e.g. scooter, bikes, wheelchair, drone, etc.) to extend MaaS service beyond road for adventure/pleasure trips, door-to-door mobility access, etc. In many geographies, transportation by animal, bike, scooter, etc. is both a necessity as well as a tourist experience. There is a rich supplier community that offers these options. Connectivity may also be intermittent in first/last mile. The F2LM platform provides a way to connect this supply chain to the MaaS ecosystem.

The non-traditional transport (e.g., animal, bike, scooter, etc.) will be equipped with or associated with MaaS nodes in the F2LM platform. In some cases, stationary or mobile MaaS Hotspots may be deployed at first/last mile locations to integrate the MaaS nodes in the MaaS system. F2LM MaaS makes Hotspots as well as other MaaS nodes capable of micro-payments. In extremely rural first/last mile deployments, the MaaS F2LM platform may be the only viable automated payment infrastructure. A discovery and directory manager container may be running continuously on these MaaS nodes to discover each other as well as to discover the first/last mile services provided by these nodes. Discovered first/last mile services may also be frequently shared with the MaaS center.

A reputation framework is integrated into the MaaS F2LM platform to capture user trust or confidence in terms of various forms of MaaS service offerings and in terms of social interaction contexts. Reputation metadata is customized to MaaS services. Reputation metadata may be used to enhance user trust and confidence in MaaS-enabled user experiences. With a containerized F2LM solution, anyone with a mobility asset may start offering services and it is important to collect feedback about the service providers which may be eventually used to calculate a trust or reputation score for each service provider. MaaS F2LM route planning and orchestration capability allows users to specify acceptable reputation scores as input during planning.

A MaaS reputation Score and metadata is defined based on multiple factors, context data, and history of past experiences. A reputation score may be maintained at various levels of granularity and specialization so the score may be tailored to the specific type of MaaS service being provided or the type of social inclusion goal. For example, a specific transport operator may have a reputation as well as the class of transportation offered, or a per route reputation that involves a mix of transportation forms may be compared based on different mixes. MaaS reputation insights are created using artificial intelligence (AI) and deep learning (DL) algorithms that optimize for higher scores given user interest vectors and the available options in the MaaS supply chain.

For example, a social inclusion experience might encourage impromptu meetings between people of similar interests or life experience. A group of people interested in hiking a scenic route versus taking a taxi or a bus might want to assess the fitness level of other group members to ensure timely and safe hiking. A MaaS node may access fitness tracker sensors to build a fitness reputation of users that is then shared with prospective travelers to facilitate self-group formation.

During a pandemic, some users may prefer health and safety guidelines while others may ignore health and safety guidelines. If MaaS operators have a reputation score of users in terms of following health and safety guidelines in user profiles, ride and vehicle sharing among similar users may increase user experience.

Additionally, the transportation operators may have a supply chain of third-party providers that together forms a group and may have a reputation score or rating (e.g., user community, evaluating entity such as consumer protection agency, MaaS interest group, etc.) that may be used to facilitate selection of a MaaS service provider.

The MaaS route orchestration service allows users to specify a reputation score requirement as input during planning. Reputation scores of users, MaaS Operators, MaaS services, overall reputation scores per route (a mix of MaaS services/transport operators in a route) may be built and maintained to enhance user trust and confidence in MaaS-enabled user experiences. Reputation scores of transport operators and MaaS providers may be determined and maintained by a third party (e.g., user community, evaluating entity such as consumer protection agency, MaaS interest group, etc.). The reputation score of a user for various purposes may be maintained by MaaS operators (e.g., as part of a user profile, etc.).

Figure 5:
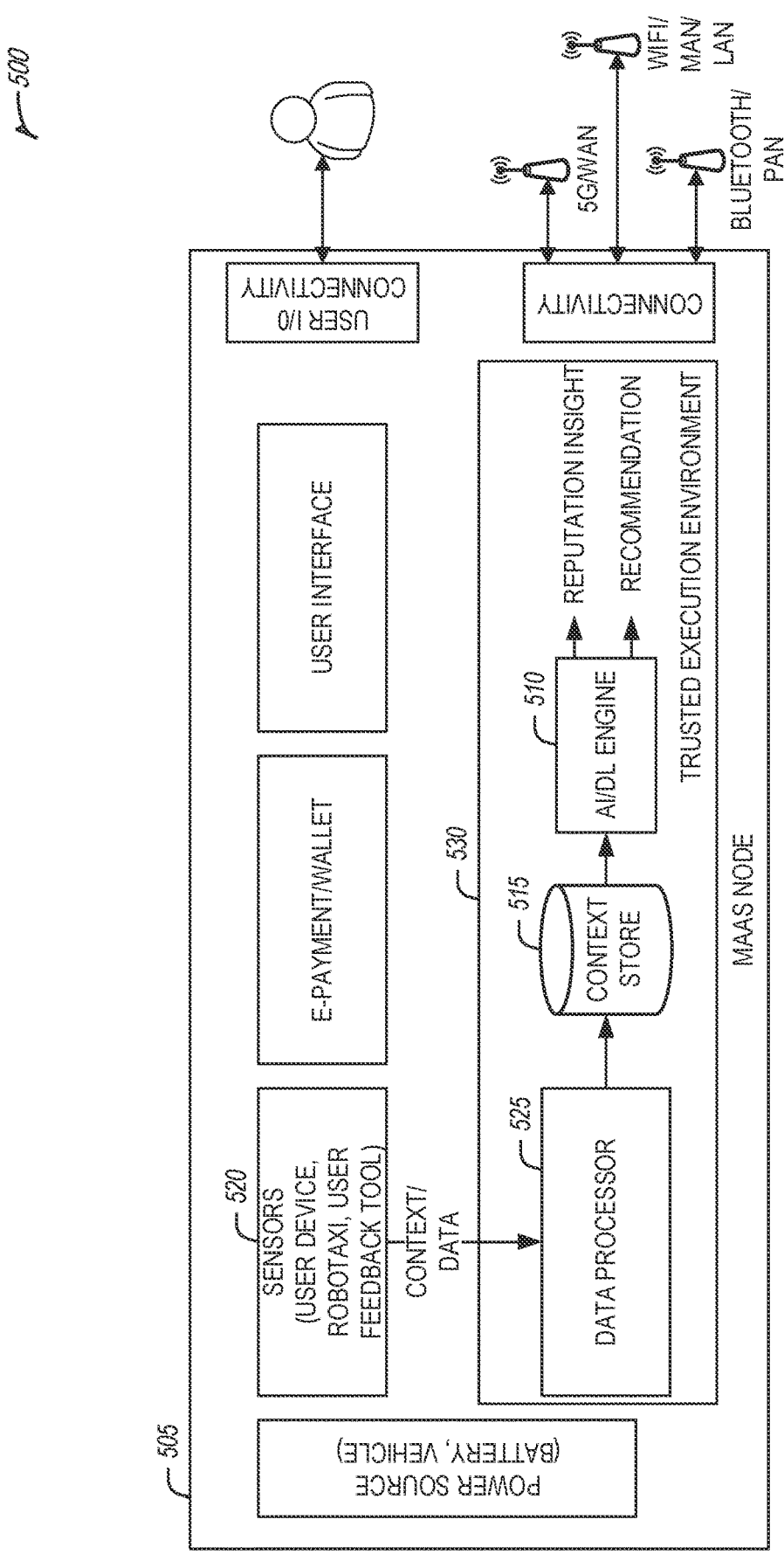
FIG. 5 illustrates an example of an environment including a mobility-as-a-service (MaaS) node that includes an artificial intelligence (AI)/deep learning (DL) engine for processing MaaS reputation for mobility-as-a-service for user experience, according to an embodiment.

FIG. 5 illustrates an example of an environment 500 including a mobility-as-a-service (MaaS) node 505 that includes an artificial intelligence (AI)/deep learning (DL) engine 510 for processing MaaS reputation for mobility-as-a-service for user experience, according to an embodiment. FIG. 5 may provide features as described in FIGS. 1, 2, 3A to 3C, and 4.

FIG. 5 shows components of the MaaS node 505 to build reputation metadata that enhances user trust and confidence in MaaS-enabled user experiences discussed earlier. The MaaS node 505 (e.g., MaaS Hotspot, mobile MaaS node like robotaxi, Edge/Cloud MaaS node, etc.) collects user context and feedback from sensors 520 and uses a data processor 525 to store the data in a context store 515. The collected data is processed using the AI/DL engine 510 in trusted execution environment 530 to get reputation insights and recommendations. The AI/DL engine 510 may be pre-trained (e.g., off-the shelf, etc.) which may be updated with time-series evolved user-profile data used for refining the training to more closely match a user profile and behavioral model. The model may be iteratively validated and deployed/updated to generate the reputation insight and recommendation in a persistently improved manner.

Figure 6:
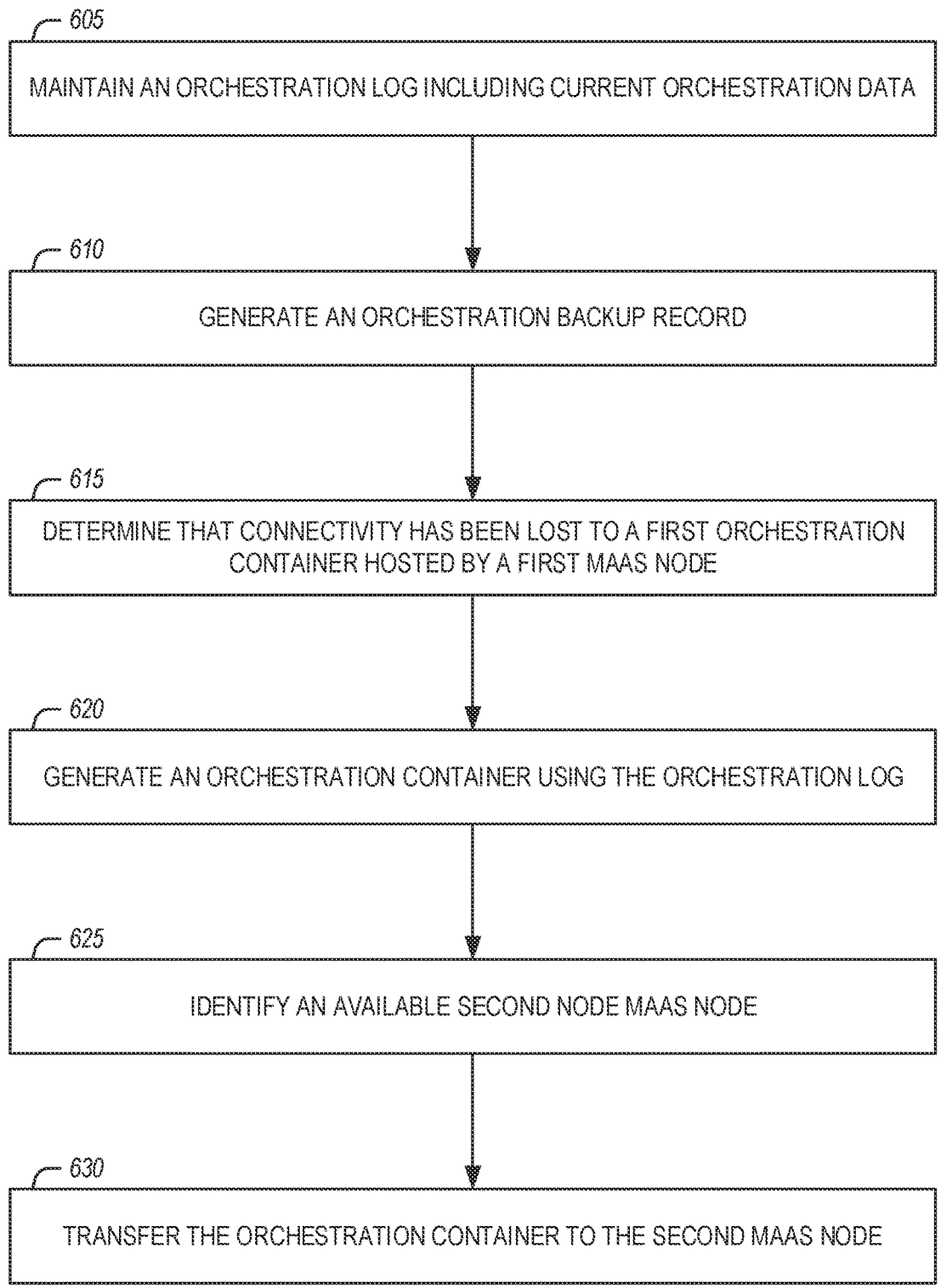
FIG. 6 illustrates an example of a method for mobility-as-a-service for user experience, according to an embodiment.

FIG. 6 illustrates an example of a method 600 for mobility-as-a-service (MaaS) for user experience, according to an embodiment. The method 600 may provide features as described in FIGS. 1, 2, 3A to 3C, 4, and 5.

At operation 605, an orchestration log is maintained that includes current orchestration data. At operation 610, an orchestration backup record is generated that includes alternate MaaS nodes on the MaaS network. At operation 615, it may be determined that connectivity has been lost to a first orchestration container hosted by a first MaaS node. In an example, the first MaaS node is attached to a robotaxi, pack animal, scooter, or ride-sharing vehicle.

At operation 620, an orchestration container is generated using the orchestration log to maintain orchestration functionality. At operation 625, an available second MaaS node is identified from the alternate MaaS nodes. At operation 630, the orchestration container may be transferred to the second MaaS node.

In an example, a directory container may be generated using named data networking and the alternate MaaS nodes may be identified using directory services provided by the directory container.

In an example a path to the MaaS network may be identified through a set of MaaS nodes. A gateway MaaS node of the set of MaaS node may include a connection to a MaaS network gateway.

In an example, reputation metadata may be collected for a MaaS service provider. The reputation data may be evaluated using an artificial intelligence processor to calculate a reputation score for the MaaS service provider and the reputation score may be published to a directory of available MaaS services. In an example, the reputation metadata includes user feedback data for the MaaS service provider, performance metric data for the MaaS service provider, or third-party evaluation data for the MaaS service provider.

In an example, a geographical location may be identified that corresponds to the MaaS network. User access objectives may be obtained for the geographic area and a user interface for user interaction with the MaaS network may be modified based on the user access objectives.

Figure 7:
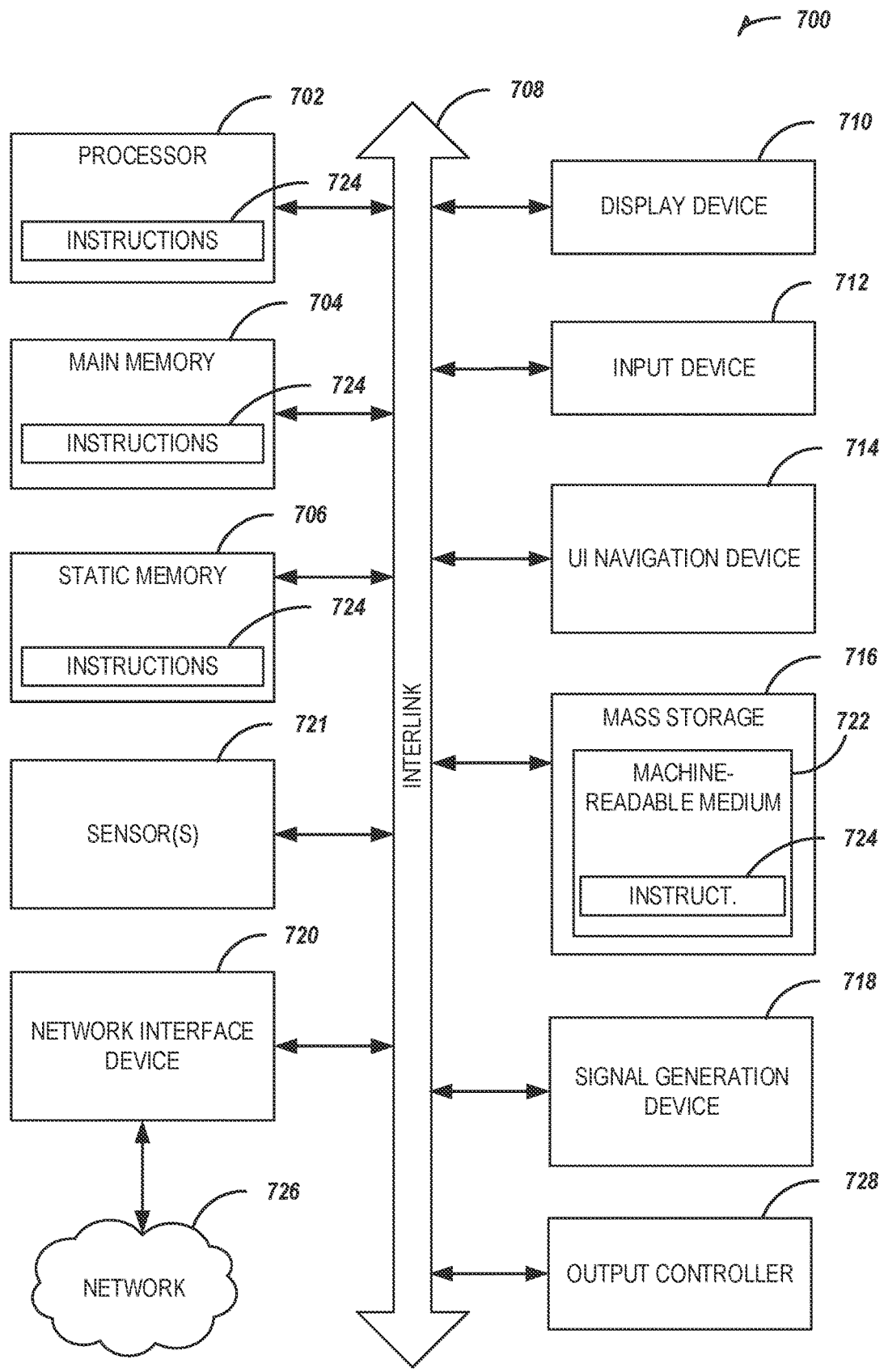
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensors. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, satellite communication networks, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Additional Notes & Examples

Example 1 is a system for containerized orchestration in a mobility-as-a-service (MaaS) network comprising: at least one processor: and memory including instructions that, when executed by the at least one processor, cause the at least one processor to perform operations to: maintain an orchestration log including current orchestration data; generate an orchestration backup record including alternate MaaS nodes on the MaaS network; determine that connectivity is lost to a first orchestration container hosted by a first MaaS node; generate a new orchestration container using the orchestration log to maintain orchestration functionality;

identify an available second MaaS node from the alternate MaaS nodes; and transfer the orchestration container to the second MaaS node.

In Example 2, the subject matter of Example 1 includes, the memory further comprising instructions that, when executed by the at least one processor, cause the at least one processor to perform operations to: generate a directory container using named data networking; and identify the alternate MaaS nodes using directory services provided by the directory container.

In Example 3, the subject matter of Examples 1-2 includes, the memory further comprising instructions that, when executed by the at least one processor, cause the at least one processor to perform operations to identify a path to the MaaS network through a set of MaaS nodes; wherein a gateway MaaS node of the set of MaaS node includes a connection to a MaaS network gateway.

In Example 4, the subject matter of Examples 2-3 includes, the memory further comprising instructions that, when executed by the at least one processor, cause the at least one processor to perform operations to: collect reputation metadata for a MaaS service provider; evaluate the reputation metadata using an artificial intelligence model to calculate a reputation score for the MaaS service provider; and publish the reputation score to a directory of available MaaS services in the directory container.

In Example 5, the subject matter of Example 4 wherein, the reputation metadata includes user feedback data for the MaaS service provider, performance metric data for the MaaS service provider, or third-party evaluation data for the MaaS service provider.

In Example 6, the subject matter of Examples 1-5 includes, the memory further comprising instructions that, when executed by the at least one processor, cause the at least one processor to perform operations to: collect reputation metadata for users, MaaS service providers, transportation routes, a class of transportation services, and transport operators; and calculate reputation scores at multiple levels of granularity for the users, the MaaS service providers, the transportation routes, the class of transportation services, and the transport operators using the reputation metadata.

In Example 7, the subject matter of Example 6 wherein, the reputation scores are used as input to select a mobility service that avoids a trip through specific routes, avoids certain services or transportation operators, follows health and safety guidelines in user profiles, or is selected by a similar user for ride and vehicle sharing.

In Example 8, the subject matter of Examples 6-7 includes, the memory further comprising instructions that, when executed by the at least one processor, cause the at least one processor to perform operations to: receive a specification of an acceptable reputation score from a user; and plan delivery of a service by the new orchestration container using the specification of the acceptable reputation score.

In Example 9, the subject matter of Examples 6-8 includes, the memory further comprising instructions that, when executed by the at least one processor, cause the at least one processor to perform operations to: collect context, feedback, and sensor-data from the MaaS network; and calculate the reputation score, reputation insights, and recommendations by evaluating the context, the feedback, and the sensor-data using a machine learning model.

In Example 10, the subject matter of Examples 1-9 includes, the memory further comprising instructions that, when executed by the at least one processor, cause the at least one processor to perform operations to: identify a geographical area corresponding to the MaaS network; obtain user access objectives for the geographical area; and modify a user interface for user interaction with the MaaS network based on the user access objectives.

In Example 11, the subject matter of Example 10 includes, the memory further comprising instructions that, when executed by the at least one processor, cause the at least one processor to perform operations to: maintain user preferred mobility service profiles for various geographical areas; and select a target mobility service for the geographical are based on a user preferred mobility service profiles for the geographical area.

In Example 12, the subject matter of Examples 10-11 includes, the memory further comprising instructions that, when executed by the at least one processor, cause the at least one processor to perform operations to: collect user requests for mobility service in the geographical area; analyze the user requests to determine aggregated geographical area user specific preferences for the mobility service; and send an aggregated report including the aggregated geographical area user specific preferences for mobility to a MaaS-center periodically or based on the occurrence of an event.

In Example 13, the subject matter of Examples 1-12 includes, the memory further comprising instructions that, when executed by the at least one processor, cause the at least one processor to perform operations to: provision a MaaS hotspot using the orchestration container; and receive a request for a mobility service from the MaaS hotspot; and facilitate delivery of the mobility service via the first MaaS node.

In Example 14, the subject matter of Examples 1-13 wherein, the MaaS network includes a set of MaaS nodes including the first MaaS node and the second MaaS node, and wherein the set of MaaS nodes are distributed among a set of vehicles operating in a geographical area.

In Example 15, the subject matter of Examples 1-14 wherein, the first MaaS node is attached to a robotaxi, scooter, or ride-sharing vehicle.

Example 16 is at least one non-transitory machine-readable medium including instructions for containerized orchestration in a mobility-as-a-service (MaaS) network that, when executed by at least one processor, cause the at least one processor to perform operations to: maintain an orchestration log including current orchestration data; generate an orchestration backup record including alternate MaaS nodes on the MaaS network; determine that connectivity is lost to a first orchestration container hosted by a first MaaS node; generate a new orchestration container using the orchestration log to maintain orchestration functionality; identify an available second MaaS node from the alternate MaaS nodes; and transfer the orchestration container to the second MaaS node.

In Example 17, the subject matter of Example 16 includes, instructions that, when executed by the at least one processor, cause the at least one processor to perform operations to: generate a directory container using named data networking; and identify the alternate MaaS nodes using directory services provided by the directory container.

In Example 18, the subject matter of Examples 16-17 includes, instructions that, when executed by the at least one processor, cause the at least one processor to perform operations to identify a path to the MaaS network through a set of MaaS nodes; wherein a gateway MaaS node of the set of MaaS node includes a connection to a MaaS network gateway.

In Example 19, the subject matter of Examples 17-18 includes, instructions that, when executed by the at least one processor, cause the at least one processor to perform operations to: collect reputation metadata for a MaaS service provider; evaluate the reputation metadata using an artificial intelligence model to calculate a reputation score for the MaaS service provider; and publish the reputation score to a directory of available MaaS services in the directory container.

In Example 20, the subject matter of Example 19 wherein, the reputation metadata includes user feedback data for the MaaS service provider, performance metric data for the MaaS service provider, or third-party evaluation data for the MaaS service provider.

In Example 21, the subject matter of Examples 16-20 includes, instructions that, when executed by the at least one processor, cause the at least one processor to perform operations to: collect reputation metadata for users, MaaS service providers, transportation routes, a class of transportation services, and transport operators; and calculate reputation scores at multiple levels of granularity for the users, the MaaS service providers, the transportation routes, the class of transportation services, and the transport operators using the reputation metadata.

In Example 22, the subject matter of Example 21 wherein, the reputation scores are used as input to select a mobility service that avoids a trip through specific routes, avoids certain services or transportation operators, follows health and safety guidelines in user profiles, or is selected by a similar user for ride and vehicle sharing.

In Example 23, the subject matter of Examples 21-22 includes, instructions that, when executed by the at least one processor, cause the at least one processor to perform operations to: receive a specification of an acceptable reputation score from a user; and plan delivery of a service by the new orchestration container using the specification of the acceptable reputation score.

In Example 24, the subject matter of Examples 21-23 includes, instructions that, when executed by the at least one processor, cause the at least one processor to perform operations to: collect context, feedback, and sensor-data from the MaaS network; and calculate the reputation score, reputation insights, and recommendations by evaluating the context, the feedback, and the sensor-data using a machine learning model.

In Example 25, the subject matter of Examples 16-24 includes, instructions that, when executed by the at least one processor, cause the at least one processor to perform operations to: identify a geographical area corresponding to the MaaS network; obtain user access objectives for the geographical area; and modify a user interface for user interaction with the MaaS network based on the user access objectives.

In Example 26, the subject matter of Example 25 includes, instructions that, when executed by the at least one processor, cause the at least one processor to perform operations to: maintain user preferred mobility service profiles for various geographical areas; and select a target mobility service for the geographical are based on a user preferred mobility service profiles for the geographical area.

In Example 27, the subject matter of Examples 25-26 includes, instructions that, when executed by the at least one processor, cause the at least one processor to perform operations to: collect user requests for mobility service in the geographical area; analyze the user requests to determine aggregated geographical area user specific preferences for the mobility service; and send an aggregated report including the aggregated geographical area user specific preferences for mobility to a MaaS-center periodically or based on the occurrence of an event.

In Example 28, the subject matter of Examples 16-27 includes, instructions that, when executed by the at least one processor, cause the at least one processor to perform operations to: provision a MaaS hotspot using the orchestration container; and receive a request for a mobility service from the MaaS hotspot; and facilitate delivery of the mobility service via the first MaaS node.

In Example 29, the subject matter of Examples 16-28 wherein, the MaaS network includes a set of MaaS nodes including the first MaaS node and the second MaaS node, and wherein the set of MaaS nodes are distributed among a set of vehicles operating in a geographical area.

In Example 30, the subject matter of Examples 16-29 wherein, the first MaaS node is attached to a robotaxi, scooter, or ride-sharing vehicle.

Example 31 is a method for containerized orchestration in a mobility-as-a-service (MaaS) network comprising: maintaining an orchestration log including current orchestration data; generating an orchestration backup record including alternate MaaS nodes on the MaaS network; determining that connectivity is lost to a first orchestration container hosted by a first MaaS node; generating a new orchestration container using the orchestration log to maintain orchestration functionality; identifying an available second MaaS node from the alternate MaaS nodes; and transferring the orchestration container to the second MaaS node.

In Example 32, the subject matter of Example 31 includes, generating a directory container using named data networking; and identifying the alternate MaaS nodes using directory services provided by the directory container.

In Example 33, the subject matter of Examples 31-32 includes, identifying a path to the MaaS network through a set of MaaS nodes; wherein a gateway MaaS node of the set of MaaS node includes a connection to a MaaS network gateway.

In Example 34, the subject matter of Examples 32-33 includes, collecting reputation metadata for a MaaS service provider; evaluating the reputation metadata using an artificial intelligence model to calculate a reputation score for the MaaS service provider; and publishing the reputation score to a directory of available MaaS services in the directory container.

In Example 35, the subject matter of Example 34 wherein, the reputation metadata includes user feedback data for the MaaS service provider, performance metric data for the MaaS service provider, or third-party evaluation data for the MaaS service provider.

In Example 36, the subject matter of Examples 31-35 includes, collecting reputation metadata for users, MaaS service providers, transportation routes, a class of transportation services, and transport operators; and calculating reputation scores at multiple levels of granularity for the users, the MaaS service providers, the transportation routes, the class of transportation services, and the transport operators using the reputation metadata.

In Example 37, the subject matter of Example 36 wherein, the reputation scores are used as input to select a mobility service that avoids a trip through specific routes, avoids certain services or transportation operators, follows health and safety guidelines in user profiles, or is selected by a similar user for ride and vehicle sharing.

In Example 38, the subject matter of Examples 36-37 includes, receiving a specification of an acceptable reputation score from a user; and planning delivery of a service by the new orchestration container using the specification of the acceptable reputation score.

In Example 39, the subject matter of Examples 36-38 includes, collecting context, feedback, and sensor-data from the MaaS network; and calculating the reputation score, reputation insights, and recommendations by evaluating the context, the feedback, and the sensor-data using a machine learning model.

In Example 40, the subject matter of Examples 31-39 includes, identifying a geographical area corresponding to the MaaS network; obtaining user access objectives for the geographical area; and modifying a user interface for user interaction with the MaaS network based on the user access objectives.

In Example 41, the subject matter of Example 40 includes, maintaining user preferred mobility service profiles for various geographical areas; and selecting a target mobility service for the geographical are based on a user preferred mobility service profiles for the geographical area.

In Example 42, the subject matter of Examples 40-41 includes, collecting user requests for mobility service in the geographical area; analyzing the user requests to determine aggregated geographical area user specific preferences for the mobility service; and sending an aggregated report including the aggregated geographical area user specific preferences for mobility to a MaaS-center periodically or based on the occurrence of an event.

In Example 43, the subject matter of Examples 31-42 includes, provisioning a MaaS hotspot using the orchestration container; and receiving a request for a mobility service from the MaaS hotspot; and facilitating delivery of the mobility service via the first MaaS node.

In Example 44, the subject matter of Examples 31-43 wherein, the MaaS network includes a set of MaaS nodes including the first MaaS node and the second MaaS node, and wherein the set of MaaS nodes are distributed among a set of vehicles operating in a geographical area.

In Example 45, the subject matter of Examples 31-44 wherein, the first MaaS node is attached to a robotaxi, scooter, or ride-sharing vehicle.

Example 46 is at least one machine-readable medium including instructions that, when executed by a machine, cause the machine to perform any method of Examples 31-45.

Example 47 is a system comprising means to perform any method of Examples 31-45.

Example 48 is a system for containerized orchestration in a mobility-as-a-service (MaaS) network comprising: means for maintaining an orchestration log including current orchestration data; means for generating an orchestration backup record including alternate MaaS nodes on the MaaS network; means for determining that connectivity is lost to a first orchestration container hosted by a first MaaS node; means for generating a new orchestration container using the orchestration log to maintain orchestration functionality; means for identifying an available second MaaS node from the alternate MaaS nodes; and means for transferring the orchestration container to the second MaaS node.

In Example 49, the subject matter of Example 48 includes, means for generating a directory container using named data networking; and means for identifying the alternate MaaS nodes using directory services provided by the directory container.

In Example 50, the subject matter of Examples 48-49 includes, means for identifying a path to the MaaS network through a set of MaaS nodes; wherein a gateway MaaS node of the set of MaaS node includes a connection to a MaaS network gateway.

In Example 51, the subject matter of Examples 49-50 includes, means for collecting reputation metadata for a MaaS service provider; means for evaluating the reputation metadata using an artificial intelligence model to calculate a reputation score for the MaaS service provider; and means for publishing the reputation score to a directory of available MaaS services in the directory container.

In Example 52, the subject matter of Example 51 wherein, the reputation metadata includes user feedback data for the MaaS service provider, performance metric data for the MaaS service provider, or third-party evaluation data for the MaaS service provider.

In Example 53, the subject matter of Examples 48-52 includes, means for collecting reputation metadata for users, MaaS service providers, transportation routes, a class of transportation services, and transport operators; and means for calculating reputation scores at multiple levels of granularity for the users, the MaaS service providers, the transportation routes, the class of transportation services, and the transport operators using the reputation metadata.

In Example 54, the subject matter of Example 53 wherein, the reputation scores are used as input to select a mobility service that avoids a trip through specific routes, avoids certain services or transportation operators, follows health and safety guidelines in user profiles, or is selected by a similar user for ride and vehicle sharing.

In Example 55, the subject matter of Examples 53-54 includes, means for receiving a specification of an acceptable reputation score from a user; and means for planning delivery of a service by the new orchestration container using the specification of the acceptable reputation score.

In Example 56, the subject matter of Examples 53-55 includes, means for collecting context, feedback, and sensor-data from the MaaS network; and means for calculating the reputation score, reputation insights, and recommendations by evaluating the context, the feedback, and the sensor-data using a machine learning model.

In Example 57, the subject matter of Examples 48-56 includes, means for identifying a geographical area corresponding to the MaaS network; means for obtaining user access objectives for the geographical area; and means for modifying a user interface for user interaction with the MaaS network based on the user access objectives.

In Example 58, the subject matter of Example 57 includes, means for maintaining user preferred mobility service profiles for various geographical areas; and means for selecting a target mobility service for the geographical are based on a user preferred mobility service profiles for the geographical area.

In Example 59, the subject matter of Examples 57-58 includes, means for collecting user requests for mobility service in the geographical area; means for analyzing the user requests to determine aggregated geographical area user specific preferences for the mobility service; and means for sending an aggregated report including the aggregated geographical area user specific preferences for mobility to a MaaS-center periodically or based on the occurrence of an event.

In Example 60, the subject matter of Examples 48-59 includes, means for provisioning a MaaS hotspot using the orchestration container; and means for receiving a request for a mobility service from the MaaS hotspot; and means for facilitating delivery of the mobility service via the first MaaS node.

In Example 61, the subject matter of Examples 48-60 wherein, the MaaS network includes a set of MaaS nodes including the first MaaS node and the second MaaS node, and wherein the set of MaaS nodes are distributed among a set of vehicles operating in a geographical area.

In Example 62, the subject matter of Examples 48-61 wherein, the first MaaS node is attached to a robotaxi, scooter, or ride-sharing vehicle.

Example 63 is at least one machine-readable medium including instructions that, when executed by processing circuitry, cause the processing circuitry to perform operations to implement of any of Examples 1-62.

Example 64 is an apparatus comprising means to implement of any of Examples 1-62.

Example 65 is a system to implement of any of Examples 1-62.

Example 66 is a method to implement of any of Examples 1-62.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for containerized orchestration in a mobility-as-a-service (MaaS) network comprising:
    at least one processor; and
    memory including instructions that, when executed by the at least one processor, cause the at least one processor to perform operations to:
        maintain an orchestration log including current orchestration data for a first orchestration service container hosted by a first MaaS node operating on the MaaS network, the current orchestration data including service operations completed by the first orchestration service container;
        generate an orchestration backup record for the first orchestration service container including alternate MaaS nodes on the MaaS network;
        determine that connectivity is lost to the first orchestration service container hosted by the first MaaS node;
        generate a new orchestration service container using the orchestration log to maintain orchestration functionality;
        generate a directory container using named data networking;
        identify an available second MaaS node from the alternate MaaS nodes included in the orchestration backup record, the alternate MaaS nodes identified using directory services provided by the directory container; and
        transfer the new orchestration service container to the available second MaaS node to provide orchestration services to the available second MaaS node and MaaS nodes communicatively coupled to the available second MaaS node.

2. The system of claim 1, the memory further comprising instructions that, when executed by the at least one processor, cause the at least one processor to perform operations to:
    collect reputation metadata for a MaaS service provider;
    evaluate the reputation metadata using an artificial intelligence model to calculate a reputation score for the MaaS service provider; and
    publish the reputation score to a directory of available MaaS services in the directory container.

3. The system of claim 1, the memory further comprising instructions that, when executed by the at least one processor, cause the at least one processor to perform operations to:
    collect reputation metadata for users, MaaS service providers, transportation routes, a class of transportation services, and transport operators; and
    calculate reputation scores at multiple levels of granularity for the users, the MaaS service providers, the transportation routes, the class of transportation services, and the transport operators using the reputation metadata.

4. The system of claim 3, wherein the reputation scores are used as input to select a mobility service that avoids a trip through specific routes, avoids certain services or transportation operators, follows health and safety guidelines in user profiles, or is selected by a similar user for ride and vehicle sharing.

5. The system of claim 1, the memory further comprising instructions that, when executed by the at least one processor, cause the at least one processor to perform operations to:

identify a geographical area corresponding to the MaaS network;
obtain user access objectives for the geographical area; and
modify a user interface for user interaction with the MaaS network based on the user access objectives.

6. The system of claim 5, the memory further comprising instructions that, when executed by the at least one processor, cause the at least one processor to perform operations to:
collect user requests for mobility service in the geographical area;
analyze the user requests to determine aggregated geographical area user specific preferences for the mobility service; and
send an aggregated report including the aggregated geographical area user specific preferences for mobility to a MaaS-center periodically or based on occurrence of an event.

7. The system of claim 1, the memory further comprising instructions that, when executed by the at least one processor, cause the at least one processor to perform operations to:
provision a MaaS hotspot using the new orchestration service container;
receive a request for a mobility service from the MaaS hotspot; and
facilitate delivery of the mobility service via the first MaaS node.

8. At least one non-transitory machine-readable medium including instructions for containerized orchestration in a mobility-as-a-service (MaaS) network that, when executed by at least one processor, cause the at least one processor to perform operations to:
maintain an orchestration log including current orchestration data for a first orchestration service container hosted by a first MaaS node operating on the MaaS network, the current orchestration data including service operations completed by the first orchestration service container;
generate an orchestration backup record for the first orchestration service container including alternate MaaS nodes on the MaaS network;
determine that connectivity is lost to the first orchestration service container hosted by the first MaaS node;
generate a new orchestration service container using the orchestration log to maintain orchestration functionality;
generate a directory container using named data networking;
identify an available second MaaS node from the alternate MaaS nodes included in the orchestration backup record, the alternate MaaS nodes identified using directory services provided by the directory container; and
transfer the new orchestration service container to the available second MaaS node to provide orchestration services to the available second MaaS node and MaaS nodes communicatively coupled to the available second MaaS node.

9. The at least one non-transitory machine-readable medium of claim 8, further comprising instructions that, when executed by the at least one processor, cause the at least one processor to perform operations to:
collect reputation metadata for a MaaS service provider;
evaluate the reputation metadata using an artificial intelligence model to calculate a reputation score for the MaaS service provider; and
publish the reputation score to a directory of available MaaS services in the directory container.

10. The at least one non-transitory machine-readable medium of claim 8, further comprising instructions that, when executed by the at least one processor, cause the at least one processor to perform operations to:
collect reputation metadata for users, MaaS service providers, transportation routes, a class of transportation services, and transport operators; and
calculate reputation scores at multiple levels of granularity for the users, the MaaS service providers, the transportation routes, the class of transportation services, and the transport operators using the reputation metadata.

11. The at least one non-transitory machine-readable medium of claim 10, wherein the reputation scores are used as input to select a mobility service that avoids a trip through specific routes, avoids certain services or transportation operators, follows health and safety guidelines in user profiles, or is selected by a similar user for ride and vehicle sharing.

12. The at least one non-transitory machine-readable medium of claim 8, further comprising instructions that, when executed by the at least one processor, cause the at least one processor to perform operations to:
identify a geographical area corresponding to the MaaS network;
obtain user access objectives for the geographical area; and
modify a user interface for user interaction with the MaaS network based on the user access objectives.

13. The at least one non-transitory machine-readable medium of claim 12, further comprising instructions that, when executed by the at least one processor, cause the at least one processor to perform operations to:
collect user requests for mobility service in the geographical area;
analyze the user requests to determine aggregated geographical area user specific preferences for the mobility service; and
send an aggregated report including the aggregated geographical area user specific preferences for mobility to a MaaS-center periodically or based on occurrence of an event.

14. The at least one non-transitory machine-readable medium of claim 8, further comprising instructions that, when executed by the at least one processor, cause the at least one processor to perform operations to:
provision a MaaS hotspot using the new orchestration service container;
receive a request for a mobility service from the MaaS hotspot; and
facilitate delivery of the mobility service via the first MaaS node.

15. A system for containerized orchestration in a mobility-as-a-service (MaaS) network comprising:
means for maintaining an orchestration log including current orchestration data for a first orchestration service container hosted by a first MaaS node operating on the MaaS network, the current orchestration data including service operations completed by the first orchestration service container;
means for generating an orchestration backup record for the first orchestration service container including alternate MaaS nodes on the MaaS network;
means for determining that connectivity is lost to the first orchestration service container hosted by the first MaaS node;

means for generating a new orchestration service container using the orchestration log to maintain orchestration functionality;
means for generating a directory container using named data networking;
means for identifying an available second MaaS node from the alternate MaaS nodes included in the orchestration backup record, wherein means for identifying the alternate MaaS nodes uses directory services provided by the directory container; and
means for transferring the new orchestration service container to the available second MaaS node to provide orchestration services to the available second MaaS node and MaaS nodes communicatively coupled to the available second MaaS node.

16. The system of claim 15, further comprising:
means for collecting reputation metadata for a MaaS service provider;
means for evaluating the reputation metadata using an artificial intelligence model to calculate a reputation score for the MaaS service provider; and
means for publishing the reputation score to a directory of available MaaS services in the directory container.

17. The system of claim 15, further comprising:
means for collecting reputation metadata for users, MaaS service providers, transportation routes, a class of transportation services, and transport operators; and
means for calculating reputation scores at multiple levels of granularity for the users, the MaaS service providers, the transportation routes, the class of transportation services, and the transport operators using the reputation metadata.

18. The system of claim 17, wherein the reputation scores are used as input to select a mobility service that avoids a trip through specific routes, avoids certain services or transportation operators, follows health and safety guidelines in user profiles, or is selected by a similar user for ride and vehicle sharing.

19. The system of claim 15, further comprising:
means for identifying a geographical area corresponding to the MaaS network;
means for obtaining user access objectives for the geographical area; and
means for modifying a user interface for user interaction with the MaaS network based on the user access objectives.

20. The system of claim 19, further comprising:
means for collecting user requests for mobility service in the geographical area;
means for analyzing the user requests to determine aggregated geographical area user specific preferences for the mobility service; and
means for sending an aggregated report including the aggregated geographical area user specific preferences for mobility to a MaaS-center periodically or based on occurrence of an event.

21. The system of claim 15, further comprising:
means for provisioning a MaaS hotspot using the new orchestration service container;
means for receiving a request for a mobility service from the MaaS hotspot; and
means for facilitating delivery of the mobility service via the first MaaS node.

* * * * *